(No Model.)

R. S. CUTTING & H. A. SPENCER.
PEN HOLDER.

No. 285,578. Patented Sept. 25, 1883.

WITNESSES:
Wm. L. Cash.
H. J. Miller.

INVENTOR:
Robert S Cutting
Harvey A Spencer
by Jos. A Miller & Co att'ys

UNITED STATES PATENT OFFICE.

ROBERT S. CUTTING, OF PROVIDENCE, RHODE ISLAND, AND HARVEY A. SPENCER, OF NEW YORK, N. Y.

PEN-HOLDER.

SPECIFICATION forming part of Letters Patent No. 285,578, dated September 25, 1883.

Application filed July 3, 1882. (No model.)

*To all whom it may concern:*

Be it known that we, ROBERT S. CUTTING, of the city and county of Providence, Rhode Island, and HARVEY A. SPENCER, of the city, county, and State of New York, have invented a new and useful Improvement in Pen-Holders; and we hereby declare that the following is a full, clear, and exact description of the same, reference being had to the accompanying drawings, forming part of this specification.

This invention has reference to an improvement in the tip for a pen-holder.

The invention consists in the peculiar and novel construction of the supplemental tip, by which the pen can be placed either on a line with the stick or at an angle with the same, with the pen in the same plane, and the point practically in the same place, whether inserted into one place or the other.

The object of the invention is to facilitate the teaching of penmanship by placing the pen in the oblique position first, indicating thereby the proper position of the letters, and then placing the pen in the straight position, so that the learner will acquire a steady hand and become accustomed to make the down-strokes of the letters at the proper angle.

Figure 1:
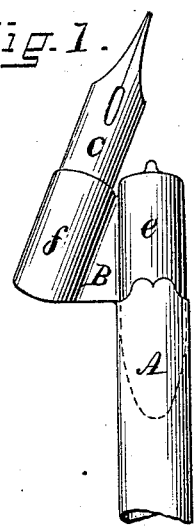
Figure 2:
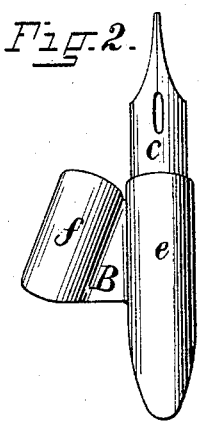
Figure 3:
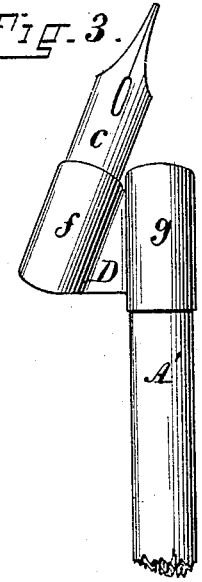
Figure 4:
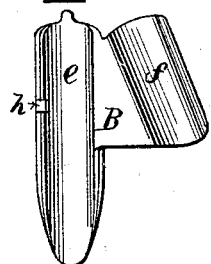
Figure 6:
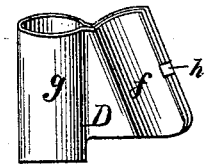
Figure 5:
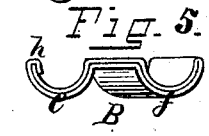
Figure 7:
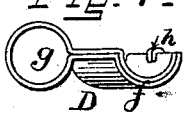
Figure 8:
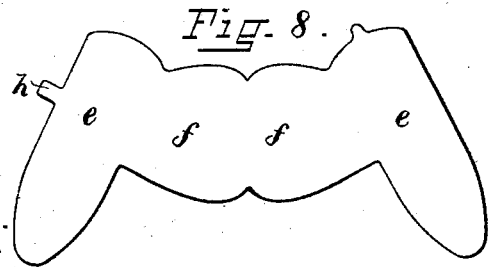

Figure 1 is a view of the improved pen-tip shown secured in an ordinary holder, the pen being placed in the oblique holder. Fig. 2 is a view of the pen-tip, the pen being in the straight part of the tip. Fig. 3 is a view of a modification of the pen-tip shown secured to the ordinary pen stick or handle, usually split in the end, so as to receive the pen. Fig. 4 is a view, looking at the under side of our improved pen-tip, showing the same constructed of one sheet of metal. Fig. 5 is an end view of the same. Fig. 6 is a perspective view, looking at the under side of the modification, showing the tube for securing the pen-tip to the stick or holder made in one piece of sheet metal. Fig. 7 is an end view of the same. Fig. 8 is a view of the sheet of metal from which the pen-tip is made by bending the same into shape.

In the drawings, A is a metal pen-holder of the ordinary construction, usually consisting of a tube, within which a segmental piece of metal is placed, so that a pen can be inserted and held. A' is a stick or holder, to the end of which the pen-holder is secured.

B is a supplemental pen-tip, constructed so as to be inserted into the ordinary pen-holder and to receive the pen, either in the line of the holder, as in ordinary holders, or oblique to the holder, but on the same plane with the same.

C is the pen.

B is the modification of the supplemental holder, consisting of a tubular piece, $g$, which is passed over the ordinary holder, and the concaved piece $f$ oblique to the tubular piece, to receive the pen when it is desired to set the same oblique.

The supplemental holder B is made of one sheet of metal, the blank of which it is formed being shown in Fig. 8. It consists of the concaved piece $e$, one end of which being made to receive the pen and the other to enter the ordinary pen-holder, as is clearly shown in the drawings. The blank is bent so as to form two double concave channels, $e$ and $f$, and is provided with the lip $h$, which, when bent over the inner sheet, holds the same in place, so that no solder is required and the metal retains its original springiness. The holder D is made in the same manner, except that the tube $g$ takes the place of the concave $e$. Either of these supplemental holders can be secured to the ordinary pen-holder, such as are now sold in the market, and without any changes the supplemental holder allows the pen to be inserted either in line with the holder or oblique to the said axial line, thus enabling the writer to place the pen as required and converting the ordinary holder into an oblique holder at pleasure.

We are aware that holders have heretofore been made into which a pen could be inserted either in the direction of the handle or oblique thereto; but in such holders the pen could not be inserted on the same plane in either case, and when inserted in the direction of the handle it was below the handle, and such holders could not be inserted into the ordinary holder.

Although the supplemental holder is usually made of metal, it may be made of rubber, celluloid, or any other suitable material.

Having thus described our invention, we claim as new and desire to secure by Letters Patent—

1. As a new article of manufacture, a supplemental pen-tip having two independent pen-apertures arranged at oblique angles to each other.

2. A supplemental tip for pen-holders, consisting of a blank bent upon itself to form a double web having two pen-holding concaves arranged at oblique angles to each other.

3. The combination, with a pen-holder, of a supplemental tip consisting of a blank bent to form two pen-apertures arranged at oblique angles to each other.

ROBERT S. CUTTING.
HARVEY A. SPENCER.

Witnesses:
H. J. MILLER,
WM. T. COOP,
AIMÉE HART,
ANNIE DE RON.